United States Patent [19]
Vatsaas

[11] Patent Number: 6,092,638
[45] Date of Patent: Jul. 25, 2000

[54] SPLINELESS ROTATIONAL CONTROL APPARATUS

[75] Inventor: Rick Vatsaas, Eagan, Minn.

[73] Assignee: Horton, Inc., Minneapolis, Minn.

[21] Appl. No.: 09/035,732

[22] Filed: Mar. 5, 1998

[51] Int. Cl.[7] .................................................. F16D 19/00
[52] U.S. Cl. ................. 192/85 A; 192/91 A; 192/113.21
[58] Field of Search ............................... 192/85 A, 91 A, 192/110 B, 113.21, 113.23, 48.2

[56] References Cited

U.S. PATENT DOCUMENTS

| | | | |
|---|---|---|---|
| 3,253,687 | 5/1966 | Young | 192/85 |
| 4,132,301 | 1/1979 | Zabonick | 192/85 AA |
| 4,355,710 | 10/1982 | Schilling | 192/91 A |
| 4,418,807 | 12/1983 | Raines | 192/18 A |
| 4,425,993 | 1/1984 | Schilling | 192/85 A |
| 4,427,102 | 1/1984 | Schilling | 192/85 A |
| 4,460,079 | 7/1984 | Hanks | 192/85 A |
| 4,541,516 | 9/1985 | Fenzel | 192/91 A |
| 4,657,126 | 4/1987 | Hanks et al. | 192/91 A |
| 4,830,161 | 5/1989 | Hall et al. | 192/91 A |
| 4,877,117 | 10/1989 | Kniebel et al. | 192/85 A |
| 4,909,367 | 3/1990 | Elmer | 192/58 B |
| 5,215,175 | 6/1993 | Fenzel | 192/91 A |
| 5,398,794 | 3/1995 | Walberg et al. | 192/85 A |
| 5,586,636 | 12/1996 | Linnig | 192/48.2 |
| 5,636,719 | 6/1997 | Davis et al. | 192/48.2 |
| 5,704,461 | 1/1998 | Vatsaas et al. | 192/85 A |

FOREIGN PATENT DOCUMENTS 0731918  5/1980  U.S.S.R. .

Primary Examiner—Charles A Marmor
Assistant Examiner—Tisha D. Waddell
Attorney, Agent, or Firm—Alan Kamrath; Oppenheimer, Wolff & Donnelly, LLP

[57] ABSTRACT

A rotational control apparatus (10, 10a) for controlling the transmission of rotational forces between first and second relatively rotatable members (26, 120, 120a) includes a piston (76, 76a) interconnected for concurrent axial movement with the second member through a bearing unit (146) which enables relative rotation and concurrent axial shifting of the piston (76, 76a) and the second member (120, 120a). The pistons (76, 76a) is only interconnected to the first member (26) through the use of one or more springs (116) such that at least partial relative rotation between the piston (76, 76a) and the first member (26) is accommodated. The piston (76, 76a) includes one axial side surface (80) that defines an enlarged area to be acted upon by a source of pressurized fluid introduced into a chamber (92) to cause the piston (b 76, 76a) and the second member (120, 120a) to simultaneously shift against the biasing force of the springs (116) in order to control the selective engagement/ disengagement between the first rotatable member (26) and the second member (120, 120a).

23 Claims, 2 Drawing Sheets

SPLINELESS ROTATIONAL CONTROL APPARATUS

BACKGROUND OF THE INVENTION

The present invention pertains to a rotational control apparatus and, more particularly, a splineless rotational control apparatus adapted for use in selectively controlling the transmission of rotational forces between first and second relatively rotatable members, and specifically in the preferred form to a frictional clutching device for driving a fan.

When it is desired to intermittently transmit rotational forces from one rotatable component to another, it is commonplace to interconnect the components with a clutch and then to selectively activate and de-activate the clutch as needed. Known clutch arrangements can be controlled using electrical, mechanical, pneumatic or hydraulic based actuation systems. Each of these actuation systems typically function by applying an axial load on a coupling element, generally constituted by either one of the rotatable components or a separate part, to create some relative axial shifting between the coupling element and one of the rotatable components in order to drivingly interconnect the two rotatable components.

In cases where a separate coupling element is utilized, the coupling element is usually drivingly connected with one of the rotatable components through a spline connection. With this arrangement, the coupling element can be readily shifted in the axial direction while still maintaining a drive connection with the respective rotatable component. The major disadvantage associated with this type of clutch is that the splines represent a high wear item and require expensive machining. Obviously, as the spline connection deteriorates, the entire function of the clutch is adversely affected and maintenance is required. Furthermore, the need for a lubricant, such as grease, is present.

In fluid actuated systems, the coupling element is almost invariably constituted by an annular piston. Typically, the piston will be acted upon by at least one spring which biases the piston towards one of an activated or de-activated position. When the two rotatable components are to be interconnected, fluid pressure acts on a side surface of the piston, opposite to that of the spring, to cause the piston to be axially shifted. Since the axial shifting force generated by the fluid is equal to the pressure of the fluid times the associated surface area of the piston, the surface area of the piston has a direct bearing on the level of force that can be developed. However, clutch pistons of this type typically have small surface areas, especially in the case of annular pistons which are positioned around hubs or the like. Correspondingly, these clutches have relatively low engagement and disengagement forces associated therewith.

Another problem recognized in this art concerns the transmission of loads through bearings. It is often found in the art of rotational control devices that rather high loads, particularly axial loads, are placed on bearing units arranged between relatively rotatable members. This high axial loading often results in fatigue failure of the bearings, thereby requiring the bearings to be periodically replaced.

Based on these and other recognized problems in the art, there exists the need for a rotational control device which avoids the use of a spline connection, enables a relatively high engagement or disengagement force to be developed and limits the degree of axial loading placed upon bearings therein.

SUMMARY OF THE INVENTION

The present invention solves these and other problems and deficiencies in the art by providing a rotational control apparatus having a fixed support shaft upon which is rotatably mounted a first member through a first bearing unit. At a position axially spaced from the first bearing unit, a first engagement surface is provided for rotation with the first member. A second member has a second engagement surface associated therewith, with the second engagement surface being adapted to be selectively placed into frictional engagement with the first engagement surface to interconnect the first and second members.

To interconnect the engagement surfaces, a piston is positioned axially between the first and second members. In the most preferred form of the invention, the piston, which is circular or disc-shaped as opposed to being annular, extends radially across and sealing engages an outer annular portion of the first member. With this arrangement, the piston has associated therewith an enlarged surface area which is preferably adapted to be acted upon by a pressurized fluid in order to enable the piston to be shifted relative to the first member. A cap member is sealing mounted to an inner axial portion of the first member such that the cap member, portions of the First member and the piston define a fluid actuation/de-actuation chamber for the rotational control apparatus.

The piston is rotatably supported by a second bearing unit that is interposed between the piston and the second member. Although relative rotation is permitted between the piston and the second member, the piston and second member are interconnected for concurrent axial movement through the second bearing. Therefore, shifting of the piston causes engagement and disengagement of the first and second engagement surfaces. At least one spring is provided to bias the piston to either an engaged or disengaged position, with the spring acting between the piston and a radially extending reaction plate fixed for rotation with the first member. In one preferred form of the invention, the reaction plate defines multiple, annularly spaced and axially extending cavities which receive respective springs that act to bias the piston into an engaged position. In another preferred form of the invention, annular springs are interposed between the reaction plate and the piston to bias the piston to a disengaged position.

In either form of the invention, the piston is not directly drivingly engaged with the first member such that the need for splines in the rotational control apparatus is avoided. In addition, the bearing units are situated such that minimal axial loading is placed thereupon when the first and second members of the rotational control apparatus are engaged. Furthermore, as indicated above, the piston defines an enlarged surface area which can be acted upon by a fluid or other axial force developing mechanism such that large engagement/disengagement forces can be created.

It is thus an object of the present invention to provide an improved rotational control apparatus for use in selectively controlling the transmission of forces, between first and second relatively rotatable members.

It is another object of the present invention to provide a rotational control apparatus of the type having a fixed support shaft which rotatably supports the first member through a first bearing unit.

It is still another object of the present invention to provide a rotational control apparatus which is actuated through the use of an axially shifting piston having a large associated piston area so as to enable the development of rather large engagement or disengagement forces.

It is still another object of the present invention to provide a rotational control apparatus wherein fluid pressure can be introduced into a chamber defined by the piston, portions of the first member and a cap member sealingly mounted to the first member in order to axially shift the piston.

It is a further object of the present invention to provide a rotational control apparatus wherein the piston is axially shiftably mounted without the use of any spline connections.

It is a still further object of the present invention to provide a rotational control apparatus wherein the piston is interconnected through a second bearing unit for relative rotational and concurrent axial movement with the second member.

It is a still further object of the present invention to provide a rotational control apparatus which can be spring biased to either an engaged or disengaged position.

It is a still further object of the present invention to provide a rotational control apparatus designed to exert minimal loading on the bearing units in order to increase the useful lives thereof.

These and other objects, features and advantages of the present invention will become more readily apparent from the following detailed description of preferred embodiments of the invention when taken in conjunction with the drawings wherein like reference numerals refer to corresponding parts.

Figure 1:
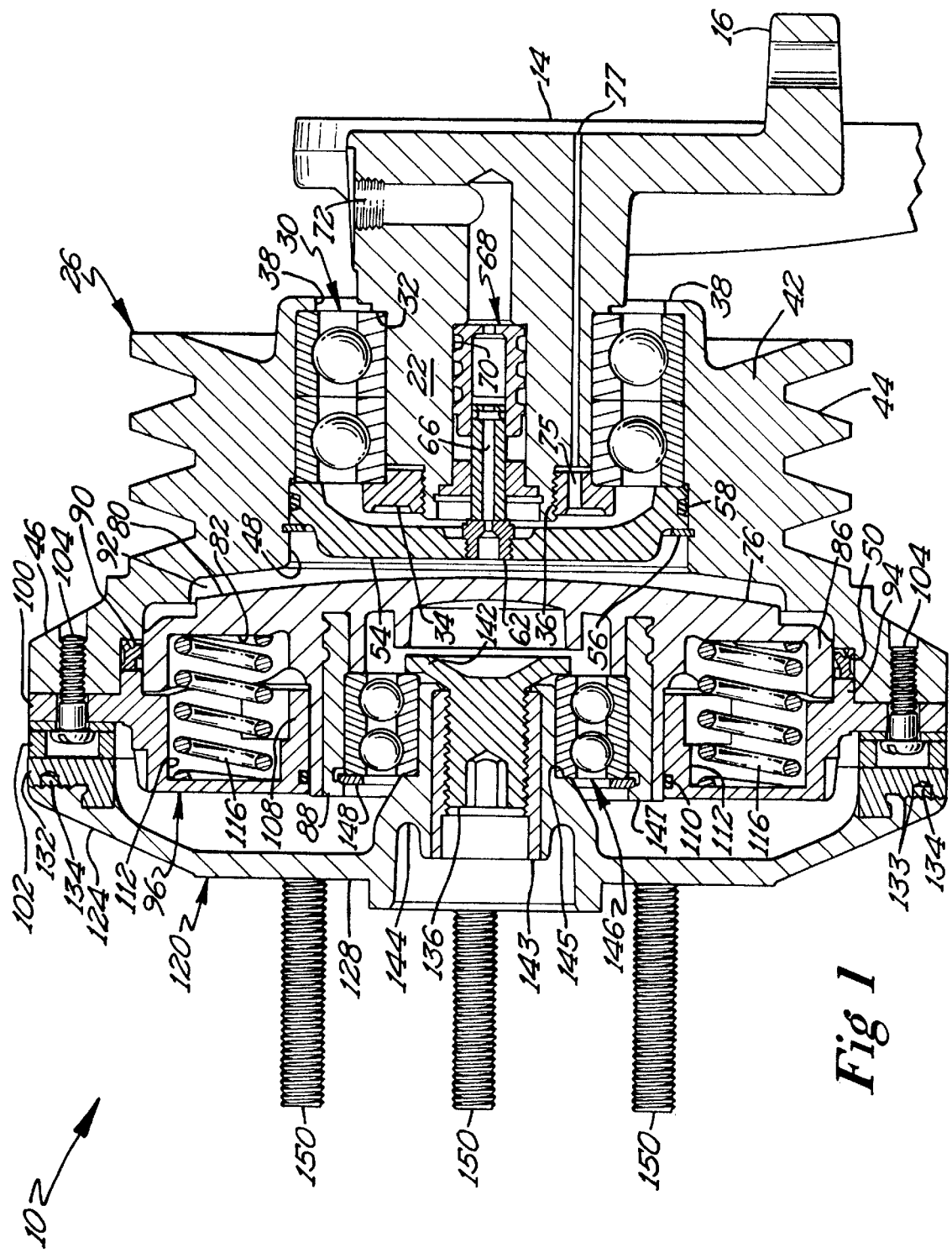
FIG. 1 is a cross-sectional view of a rotational control apparatus constructed in accordance with a first preferred embodiment of the present invention.

It should be noted that all the figures are drawn for case of explanation of the basic teachings of the present invention only; the extensions of the figures with respect to number, position, relationship and dimensions of the parts to form the preferred embodiment will be explained or will be within the skill of the art after the following teachings of the present invention have been read and understood.

Furthermore, when the terms "first", "second", "inner", "outer", "radially", "axially", and similar terms are used herein, its should be understood that these terms have reference only to the structure shown in the drawings as it would appear to a person viewing the drawings and are utilized only to facilitate describing the invention.

DETAILED DESCRIPTION OF THE PREFERRED EMBODIMENTS

With initial reference to FIG. 1, a rotational control apparatus constructed in accordance with a first preferred embodiment according to the teachings of the invention is generally designated 10. In the most preferred form of the invention, rotational control apparatus 10 constitutes a friction clutch which is particularly adapted for use in driving a fan, such as a cooling fan used in an automotive environment. However, as it will become fully evident from reading and understanding the invention as detailed below, various aspects of the invention can be advantageously used outside this specific field, such as in the art of braking devices.

As depicted in this figure, rotational control apparatus 10 includes an integrally formed, generally L-shaped journal bracket 14 that defines a support mount for the overall apparatus. Journal bracket 14 includes a flange portion 16 through which a plurality of bolts (not shown) are adapted to extend for threadably securing journal bracket 14 in a fixed position to supporting structure (not shown), such as an engine block. Journal bracket 14 includes a shaft portion 22 that is adapted to support a sheave 26. In accordance with the preferred form according to the preferred teachings of the invention, sheave 26 constitutes a first or input member of rotational control apparatus 10 and is rotatably supported upon shaft portion 22 by means of a first bearing unit 30. More specifically, first bearing unit 30 includes inner and outer races which are press-fit upon shaft portion 22 and against sheave 26 respectively. The inner race(s) of first bearing unit 30 is axially fixed upon shaft portion 22 by abutting a shoulder 32 of shaft portion 22 at one axial position and, at a spaced axial position, through engagement with a retainer element 34 which is threadably attached to a reduced diametric, inner axial end 36 of shaft portion 22.

Sheave 26 is provided with a shoulder 38 which axially locates sheave 26 relative to first bearing unit 30. In the preferred embodiment shown, shoulder 38 represents an extension of a first or hub portion 42 of sheave 26. First portion 42 defines an outer radial grooved section 44 about which a belt (not shown) is adapted to extend for inputting a rotational driving force to sheave 26. Sheave 26 also includes a second portion 46 which is axially spaced from first portion 42. With this arrangement, sheave 26 has associated therewith an inner radial diametric surface 48 and an outer radial diametric surface 50, both of which are located within the confines of the sheave 26.

In tile most preferred form of the invention, rotational control apparatus 10 constitutes a fluid pressure controlled device. In this preferred form, rotational control apparatus 10 incorporates a cap member 54 which extends across inner diametric surface 48. As clearly shown in FIG. 1, cap member 54 also abuts the outer race of first bearing unit 30 and is maintained axially by means of a snap ring 56. A seal 58 is interposed between cap member 54 and sheave 26. At the center of cap member 54, a fluid passage defining coupling 62 is threadably secured. The passage of coupling 62 is in fluid communication with a conduit 66 of a rotary joint 68. Rotary joint 68 is mounted within a bore 70 formed in shaft portion 22 of bracket 14. In general, rotary joint 68 takes the form of a cartridge that is known in the art and therefore will not be detailed here. However, it should be noted that conduit 66 is in further fluid communication with a passage 72 formed in shaft portion 22. Therefore, with this arrangement, a supply of pressurized fluid can be forced to selectively flow through cap member 54 through passage 72, rotary joint 68 and coupling 62.

During initial assembly of rotational control apparatus 10, first bearing unit 30 is initially positioned against shoulder 38 within sheave 26. Thereafter, sheave 26 and first bearing unit 30 are slid onto shaft portion 22 of journal bracket 14 until first bearing unit 30 abuts shoulder 32. Next, retainer element 34 is threaded onto the axial end 36 of shaft portion 22 which presses the inner race of first bearing unit 30 against shoulder 32. Rotary joint 68 can actually be installed before or after the assembly of sheave 26 and first bearing unit 30 upon journal bracket 14. With seal 58 and coupling 62 attached to cap member 54, cap member 54 is slid along inner radial diametric surface 48 and pressed against the outer race of first bearing unit 30. Thereafter, snap ring 56 is mounted in an annular groove formed in diametric surface 48 to axially retain cap member 54. With this arrangement, journal bracket 14 can be avantageously formed of one piece to enhance the structural characteristics thereof while still having shaft portion 22 extend well into sheave 26. In the preferred form, the fluid passage of coupling 62 is threaded for receipt of a bolt or the like to allow removal of cap member 54 (after removal of snap ring 56) for dissassembly.

In the most preferred form of the invention, retainer element 34 is formed with a weep hole 75 and shaft portion 22 is provided with a weep passage 77 that extends from the weep hole 75 axially through journal bracket 14. With this preferred construction, if any leakage occurs between coupling 62 and rotary joint 68, the fluid will escape through the weep circuit and not through first bearing unit 30 to extend the useful life of bearing unit 30.

Rotational control apparatus 10 further includes a piston 76 having a disc-shaped portion defined, at least in part, by a first axial side surface 80 that is exposed to the pressurized fluid flowing through coupling 62. Piston 76 also includes a second axial side surface 82 from which project outer and inner axially extending portions 86 and 88. A seal 90 is interposed between outer axially extending portion 86 and surface 50 of second portion 46 of sheave 26 such that a fluid chamber 92 is defined within sheave 26, which is preferably formed of a low porosity metal Such as steel or iron and, more specifically, between cap member 54, portions of sheave 26 and first axial side surface 80 of piston 76. As will be detailed further below, piston 76 is adapted to be selectively shifted axially relative to sheave 26 in order to engage and disengage rotational control apparatus 10.

In the preferred form of the invention, seal 90 is fixed to sheave 26. More specifically, an axially extending annular projection 94 of a reaction plate 96 compresses seal 90 against sheave 26. Of course, it should be readily recognized that, while accommodating some axial movement of seal 90, seal 90 could be carried by piston 76 itself and engage surface 50. In any event, piston 76 is slidable along axial surfaces of projection 94, seal 90 and second portion 46 of sheave 26. Seal 90 preferably takes the form of a multi-cup seal and is positioned at an outermost portion of fluid chamber 92 such that viscous fluids, such as grease or other lubricants, will tend to flow radially outwardly during operation of rotational control apparatus 10 and bathe seal 90. Reaction plate 96 includes an outermost circumferential flange portion 100 that is adapted to be axially bolted to second portion 46 of sheave 26. More specifically, a frictional lining 102 that defines a first frictional engagement surface of rotational control apparatus 10 receives button head cap screws 104 that also extend through flange portion 100 and which are threadably received within second portion 46 of sheave 26. Therefore, the tightening of screws 104 secure frictional lining 102 and reaction plate 96 to sheave 26, as well as securely retaining annular seal 90 in a desired position.

Reaction plate 96 includes an inner, axially extending, annular portion 108 which is provided with a dust seal 110 and aids in defining a plurality of annularly spaced cavities 112. In the preferred embodiment, twelve such cavities 112 are equally, annularly spaced in reaction plate 96 and the walls of the cavities 112 define ribs which structurally reinforce reaction plate 96. Each of the cavities 112 is adapted to receive a compression spring 116 which extends between reaction plate 96 and second axial side surface 82 of piston 76. Due to the presence of springs 116, piston 76 is biased towards shaft portion 22, but fluid pressure delivered into fluid chamber 92 through passage 72, rotary joint 68 and fluid passage defining coupling 62 can cause piston 76 to shift relative to sheave 26 against the biasing force of springs 116. During this axial shifting, piston 76 also slides relative to reaction plate 96, with inner axially extending portion 88 of piston 76 being guided along inner axially extending portion 108 of reaction plate 96. In the most preferred form of the invention, this interface between piston 76 and reaction plate 96 is provided with a friction reducing, thermal, spray applied, ceramic/metallic coating which is TEFLON impregnated. Such an arrangement is considered advantageous over the use of a lubricant, e.g. grease, which would tend to work out into the friction surfaces and could affect the engagement/disengagement forces associated with rotational control apparatus 10. This may be of particular concern given the intended field of use of rotational control apparatus 10 and the fact that dust could easily stick to and get into any lubricant used. Also, the adjacent radial surfaces of piston 76 and reactor plate 96 are not machined along a radial plane but have a convolute shape to provide stress relief.

Rotational control apparatus 10 also includes a second, Output member 120 having a first, outer radial section 124 which is interconnected with a second, inner radial section 128. First radial section 124 has associated therewith a second frictional lining 132 that is arranged juxtaposed frictional lining 102. In the most preferred form of the invention, second frictional lining 132 is constituted by a disc formed of steel or other hardened material and is placed in an insertion mold when second member 120 is formed. In this fashion, second frictional lining 132 and second member 120 become integral. In the most preferred form of the invention, second frictional lining 132 is preferably reverse L,-shaped as shown in FIG. 1 which aids in holding the lining 132 in place. Second frictional lining 132 is also preferably formed with various radially concentric teeth 133 to enhance the heat transfer from second frictional lining 132 to second member 120, as well as increasing the adhesion area between the two components. The disc-shaped lining 132 can also be provided with various bores 134 which open on the side of second member 120 in order to enable the material for second member 120 to flow therein during the molding/casting process. Therefore, bores 134 will create pegs to prevent relative rotation between lining 132 and second member 120. Although friction lining 132 is preferably made of steel or iron, second member 120 is preferably formed from aluminum so as to be lightweight and to be easy to fabricate and machine, as well as for inertia, overall weight and reduced wear purposes. For similar reasons, piston 76 and reaction plate 96 are also preferably formed of aluminum. However, it should be appreciated that piston 76, reaction plate 96, and/or second member 120 could be formed is integral one piece castings of other material such as cast iron.

With this arrangement, frictional linings 102 and 132 define first and second frictional engagement surfaces that are adapted to abut one another when rotational control apparatus 10 is engaged. Second member 120 is adapted to be mounted through the use of a threaded stub shaft 136 having a head portion 142. More specifically, threaded stub shaft 136 is constituted by a jack bolt having a torque fitting and is adapted to be threadably received within a mounting hub 144 defined at a central portion of inner radial section 128. Mounting hub 144 is preferably formed integral with a cast-in steel insert 143 which actually is threadably attached to stub shaft 136. Mounting hub 144 is also provided with a shoulder 145 against which is positioned an inner race of a second bearing unit 146. Second bearing unit 146 has an outer race which is press fit against a thermal expansion controlling insert 147 cast integral with piston 76 and abuts piston 76 in one axial direction, with the outer race being retained in its desired position by means of a snap ring 148.

During a subsequent stage of assembly of rotational control apparatus 10, piston 76 is inserted into second portion 46 of sheave 26 and then reaction plate 96, with springs 116 positioned within cavities 112, is secured to sheave 26 by means of screws 104. With stub shaft 136 extending through second bearing unit 146, second bearing unit 146 is press fit within insert 147 and abuts piston 76. Thereafter, snap ring 148 is inserted to axially maintain the outer race of second bearing unit 146. Mainly due to the construction of reaction plate 96, it should be realized that second bearing unit 146 could be attached to piston 76 prior to the insertion of piston 76 within sheave 26 as well. Next, second member 120 is inserted within bearing unit 146. Thereafter, torque is applied to stub shaft 136 to rotate the same and draw second member 120 into second bearing unit 146 until shoulder 145 abuts the inner race of second bearing unit 146. In tightening of threaded stub shaft 136 in mounting hub 144, head portion 142 engages the inner race of second bearing unit 146 such that the inner race is retained between head portion 142 and shoulder 145. Due to this mounting arrangement and the presence of second bearing unit 146, piston 76 and second member 120 are permitted to rotate relative to one another. In addition, since second bearing unit 146 is located at an inner radial location, contaminants and friction lining dust will tend to flow radially outwardly and away from second bearing, unit 146 due to centrifugal forces created during operation of rotational control apparatus 10. Also provided on second member 120, at second radial section 128, are a plurality of annularly spaced threaded shafts or studs 150 which are preferably bonded within second member 120. Since rotational control apparatus 10, in the most preferred form of the invention, constitutes a frictional fan clutch, threaded shafts 150 are adapted to mountingly receive a fan blade ring that is to be secured to second member 120.

With this construction, first portion 42 of sheave 26 is adapted to be driven in a rotational manner relative to journal bracket 14. The driving of sheave 26 also causes rotation of reaction plate 96 and first frictional lining 102. In addition, although there is no spline connection between piston 76 and reaction plate 96 or sheave 26, piston 76 will generally be caused to rotate in unison with these components due to the arrangement and mounting of springs 116. However, it should be recognized that there is permitted at least partial relative rotation between piston 76 and both sheave 26 and reaction plate 96 and that second bearing unit 146 accommodates relative rotation between piston 76 and second member 120.

When used as a clutch wherein both sheave 26 and second member 120 are permitted to rotate, springs 116 bias piston 76 into a position which causes engagement between the first and second frictional engagement surfaces defined by frictional linings 102 and 132. However, pressurized fluid can be introduced within fluid chamber 92 to cause axial shifting of piston 76. Due to the interengagement between piston 76 and second member 120 through second bearing unit 146, axial shifting of piston 76 relative to sheave 26 will cause concurrent axial shifting of second member 120. This axial shifting of second member 120 will cause disengagement between frictional linings 102 and 132, thereby disengaging the clutching operation of rotational control apparatus 10.

At this point, it should be noted that first axial side surface 80 of piston 76 is disc-shaped, i.e., non-annular, and has a substantial radial dimension, i.e., a dimension greater than the diameter of first portion 42 of sheave 26. This construction establishes a large piston area which is acted upon by the pressurized fluid introduced into fluid chamber 92. Therefore, this large piston area enables a high disengagement force to be developed within rotational control apparatus 10 for a given fluid pressure, while also allowing a large amount of spring force to cause rapid engagement with reduced slipping and wear.

In the most preferred form of the invention, air is utilized as the fluid pressurized source. However, it should be readily recognized that other fluids could be utilized, including hydraulic fluid. In addition, other types of actuation systems could also be readily incorporated, including mechanical and eddy-current type actuation systems known in the art, without departing from the invention. In the case of an eddy-current actuation system, magnets could simply be provided on reaction plate 96, such as opposite springs 116, to cooperate with a drive ring on second member 120. In any event, it is merely important to note that springs 116 and the fluid or other piston shifting system functions to axially shift piston 76 relative to sheave 26 so as to cause selective disengagement between sheave 26 and second member 120 in this form of the invention. Therefore, if pressure was lost, rotational control apparatus 10 would assume a fail-safe, engagement mode.

When sheave 26 and second member 120 are engaged, the transfer of forces occurs at the outer radial portions of rotational control apparatus 10. More specifically, these forces are directly transferred between sheave 26 and second member 120 through frictional linings 102 and 132. With this arrangement, second bearing unit 146 does not get excessively loaded during operation of rotational control apparatus 10 such that an extended useful life of second bearing unit 146 can be realized.

At this point, it should be also realized that the rotational control apparatus 10 of the present invention could also function as a braking device such as if threaded shafts 150 or other commensurate structure are utilized to secure second member 120 against rotation. However, the fixing of second member 120 through threaded shafts 150 would still need to accommodate the axial shifting thereof in unison will piston 76. With such an arrangement, engagement between frictional linings 102 and 132 would cause braking of the rotating sheave 26. It should be further recognized that sheave 26 and second member 120 could be selectively interconnected through other structure besides the frictional linings 102 and 136, such as through the use of camming teeth or the like, without departing from the spirit of the invention.

Figure 2:
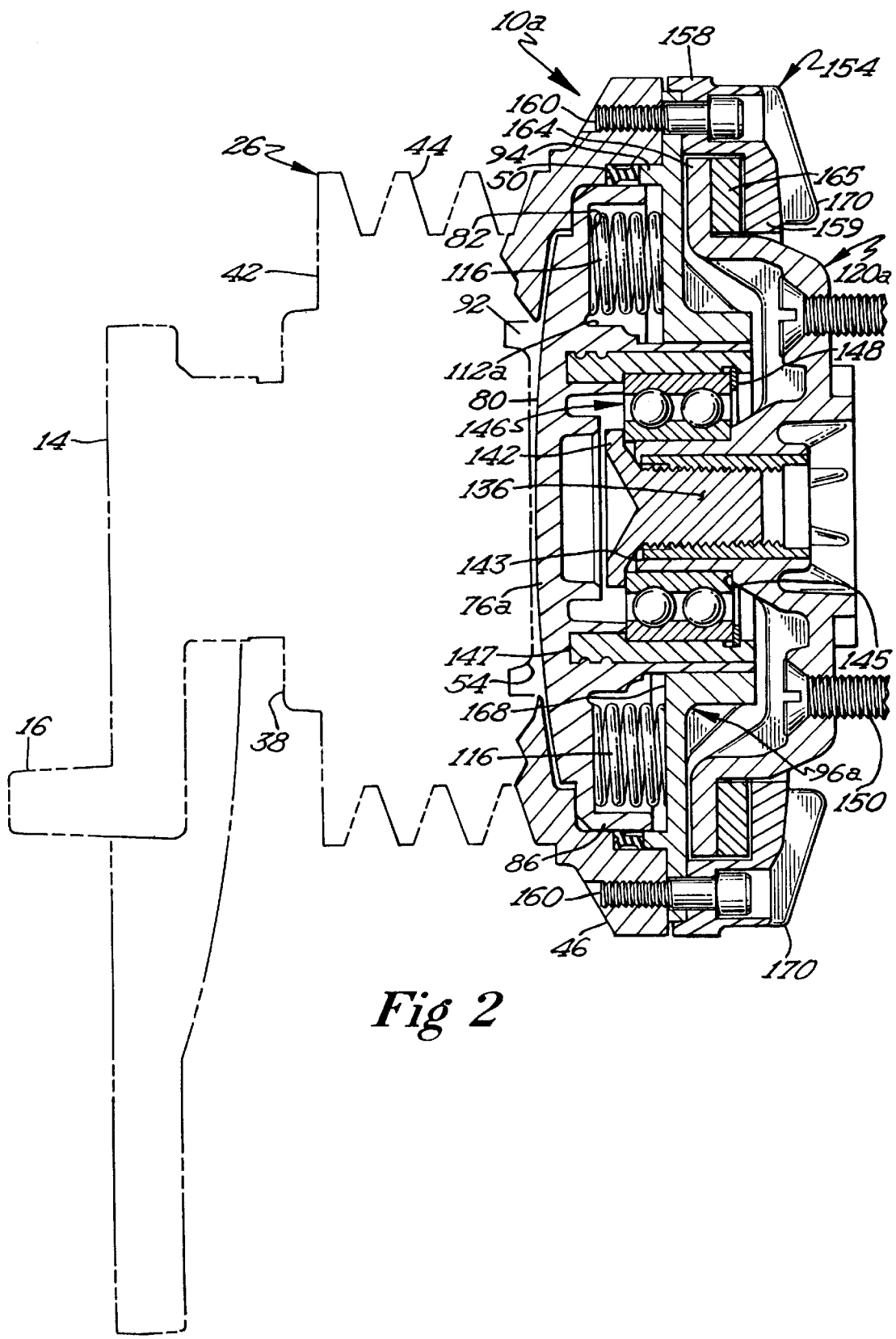
FIG. 2 is a cross-sectional view of a rotational control apparatus constructed in accordance with a second preferred embodiment of the invention.

In the embodiment of FIG. 1, springs 116 bias piston 76 into a position which causes engagement between frictional linings 102 and 132. FIG. 2 represents an alternative embodiment which is constructed substantially identical to that of the first embodiment, but wherein corresponding springs 116 are utilized to bias the rotational control apparatus 10a to a disengaged position. In accordance with this embodiment, a mounting ring 154 is secured to sheave 26 with a corresponding reaction plate 96a therebetween. Mounting ring 154 is formed with a pair of axially spaced and radially extending portions 158 and 159. Portion 158 actually receives bolts 160 for interconnecting sheave 26, reaction plate 96a and mounting ring 154 together. On the other hand, radially extending portion 159 of mounting ring 154 actually defines the first frictional engagement surface for the rotational control apparatus 10a of this embodiment. A corresponding second member 120a is provided with a radial flange 164 that becomes positioned in an undercut area generally defined by portion 159 of mounting ring 154. Radial flange 164 carries a frictional lining 165 that is adapted to engage portion 159 of mounting ring 154 in order to interconnect sheave 26 and second member 120a.

Due to the positioning of radial flange 164 between sheave 26 and portion 159 of mounting ring 154, springs 116 bias piston 76a in a direction which tends to disengage sheave 26 from second member 120a. In order to provide a more compact arrangement, piston 76a is provided with the cavities 112a for the respective springs 116 and reaction plate 96a is provided with a straight bearing surface 168 against which springs 116 act.

Except for the minor differences noted above, the embodiment of FIG. 2 is generally commensurate with that of the embodiment of FIG. 1. However, due to the presence of mounting ring 154 and the arrangement of radial flange 164, springs 116 actually bias the rotational control apparatus 10a to a disengaged position by causing a concurrent axial shifting of piston 76a and second member 120a. The introduction of pressurized fluid into fluid chamber 92 will cause piston 76a and second member 120a to simultaneously shift, thereby causing sheave 26 to be interconnected with second member 120a. For the sake of completeness, mounting ring 154 can be provided with a plurality of annularly spaced fins 170 for heat dissipation and strength purposes and corresponding fins (not labeled) can be provided in cap member 54 and in the embodiment of FIG. 1 such as along the axially sloping, outer portion of second member 120.

Now that the basic teachings of the present invention have been explained, many extensions and variations would be obvious to one having ordinary skill in the art. For example, as indicated above, although the present invention has been explained with respect to a friction clutch, it should be appreciated that the teachings may apply to other types of torque transfer and/or rotational control apparatus such as brakes. Further, although rotational control apparatus 10 and 10a of the most preferred forms include several unique features which are believed to produce synergistic results, such features could be utilized separately or in other combinations.

In general, the structural features of the present invention arc provided to extend the useful life of the device. Because of the lack of axial loads placed on the bearing units and the exclusion of high wear items such as splines, rotational control apparatus is substantially maintenance free. When used as a vehicle fan clutch, the rotational control apparatus is expected to last well beyond the full life of the vehicle.

Regardless of its particular use, the invention disclosed herein may be embodied in other specific forms without departing from the spirit or generally characteristics thereof and the embodiments described herein are to be considered in all respects illustrative and not restrictive. Instead, the scope of the invention is to be indicated by the appended claims, rather than by the foregoing description, and all changes which come within the meaning and range of equivalency of the claims are intended to be embraced therein.

I claim:

1. A rotational control apparatus comprising, in combination: a support mount adapted to be maintained in a fixed position, with the support mount including a shaft portion having an outer surface and a first fluid passage therein; a hub including an inner diametric surface spaced concentrically about the shaft portion; a first member including a first portion adapted to be interconnected to a driving source, a second portion axially spaced from the first portion and an annular, axially extending portion; a first bearing unit interposed between the support mount and the first member, with the first bearing unit including an outer race having an outer diameter dimensioned substantially equal to the inner diametric surface of the hub and an inner race slidably received and retained on the outer surface of the shaft portion, with the first member being rotatably supported by the support mount through the first bearing unit; a first engagement surface provided at the second portion of the first member for concurrent rotation with the first member; a second member having first and second sections, with the second section of the second member extending radially inwardly from the first section and being axially spaced from the first portion of the first member; a second engagement surface provided at the first section of the second member; a central mounting hub formed as part of the second member; a piston positioned axially between the first portion of the first member and the second section of the second member, with the piston including a radial portion and an inner axially extending portion, with the axially extending portion of the first member slidably supporting the axially extending portion of the piston such that the piston is axially shiftable relative to the first member; at least one spring interposed between the first member and the radial portion of the piston; a cap member attached to the first member and arranged between the first bearing unit and the piston, with the cap member having a second fluid passage and an outer diameter dimensioned substantially equal to the inner diametric surface of the hub, with the outer race being positioned against the inner diametric surface of the hub and axially captured within the hub by the cap member, with the hub, outer race and cap member being rotatable in unison relative to the shaft portion, with the cap member, the first member and the piston defining an internal chamber within the rotational control apparatus; a rotary joint mounted between the cap member and the shaft portion, with the rotary joint including a conduit which fluidly interconnects the first and second fluid passages while enabling concurrent rotation of the hub, the outer race and the cap member relative to the shaft portion; a second bearing unit interposed between the axially extending portion of the piston and the mounting hub of the second member, with the second bearing unit being attached to and interconnecting each of the piston and the second member for the concurrent axial movement relative to the first member while permitting relative rotation between the piston and the second member; and means for axially shifting the piston relative to the first member to cause selective engagement between the first and second engagement surfaces when the piston is axially shifted to selectively interconnect the first and second members.

2. A rotational control apparatus comprising, in combination: a support mount adapted to be maintained in a position fixed against rotation; a first member including a first portion adapted to be interconnected to a driving source and a second portion axially spaced from the first portion; a first bearing unit interposed between the support mount and the first member, with the first member being rotatably supported by the support mount through the first bearing unit; a first engagement surface provided at the second portion of the first member for concurrent rotation with the first member; a second member having first and second sections, with the second section of the second member extending radially inwardly from the first section and being axially spaced from the first portion of the first member; a second engagement surface provided at the first section of the second member; a piston positioned axially between the first portion of the first member and the second section of the second member, with the piston being axially shiftable relative to the first member; a second bearing unit interconnecting the piston and the second member for concurrent axial movement relative to the first member while permitting relative rotation between the piston and the second member; and means for axially shifting the piston relative to the first member to cause selective engagement between the first and second engagement surfaces in order to interconnect the first and second members.

3. The rotational control apparatus according to claim 2 wherein the piston is partially rotatable relative to the first member.

4. The rotational control apparatus according to claim 2 wherein the piston sealingly engages the second portion of the first member.

5. The rotational control apparatus according to claim 4 further comprising, in combination: a cap member sealingly engaging the first portion of the first member, with the cap member, the piston and the first member defining a fluid chamber.

6. The rotational control apparatus according to claim 2 further comprising, in combination: an internal ring including an outer radial portion fixed to the second portion of the first member and an inner radial portion.

7. The rotational control apparatus according to claim 6 wherein the piston includes an axial section positioned in slidable relationship with the inner radial portion of the internal ring.

8. The rotational control apparatus according to claim 7 further comprising, in combination: at least one spring interposed between the internal ring and the piston.

9. The rotational control apparatus according to claim 8 wherein the at least one spring biases the piston in a direction which causes the first and second engagement surfaces to abut one another.

10. The rotational control apparatus according to claim 9 further comprising, in combination: a plurality of annularly spaced cavities formed in the internal ring, with each of the cavities being adapted to receive a respective spring.

11. The rotational control apparatus according to claim 8 wherein the at least one spring biases the piston in a direction which causes axial spacing of the first and second engagement surfaces.

12. In a rotational control apparatus for selectively interconnecting first and second relatively rotatable members comprising, in combination: a support mount including a shaft portion having an outer surface and a first fluid passage therein; a hub formed as part of the first member, with the hub including an inner diametric surface spaced concentrically about the shaft portion; a bearing unit including an outer race having an outer diameter dimensioned substantially equal to the inner diametric surface of the hub and an inner race slidably received and retained on the outer surface of the shaft portion; a cap member having a second fluid passage and an outer diameter dimensioned substantially equal to the inner diametric surface of the hub, with the outer race being positioned against the inner diametric surface of the hub and axially captured within the hub by the cap member, with the hub, outer race and cap member being rotatable in unison relative to the shaft portion; and a rotary joint mounted between the cap member and the shaft portion, with the rotary joint including a conduit which fluidly interconnects the first and second fluid passages while enabling concurrent rotation of the hub, the outer race and the cap member relative to the shaft portion.

13. The rotational control apparatus according to claim 12 further comprising, in combination: a piston slidably positioned within the first member at a position spaced from the hub; and a chamber in fluid communication with the second fluid passage, with the chamber being defined by the piston, the first member and the cap member.

14. The rotational control apparatus according to claim 12 wherein the support mount is adapted to be maintained in a fixed position.

15. The rotational control apparatus according to claim 12 further comprising, in combination: a retainer element secured to the shaft portion and abutting the inner race of the bearing unit for axially fixing the inner race relative to the support mount.

16. The rotational control apparatus according to claim 15 further comprising, in combination: a weep hole extending through the retainer element.

17. Rotational control apparatus comprising in combination: first and second relatively rotatable members; a piston including a radial portion and an inner axially extending portion, with the first member including an annular, axially extending portion slidably supporting the axially extending portion of the piston; at least one spring interposed between the first member and the radial portion of the piston; a central mounting hub formed as part of the second member; a bearing unit interposed between the axially extending portion of the piston and the mounting hub of the second member, with the bearing unit being attached to each of the piston and the second member so as to enable relative rotation between the piston and the second member while interconnecting the piston and the second member for concurrent axial movement relative to the first member; and first and second engagement surfaces provided on the first and second members respectively, wherein the second engagement surface abuts the first engagement surface when the piston is axially shifted to selectively interconnect the first and second relatively rotatable members.

18. The rotational control apparatus according to claim 17 wherein the radial portion of the piston is disc-shaped and non-annular.

19. The rotational control apparatus according to claim 18 further comprising, in combination: a jack bolt extending through the bearing unit and being threadably secured to the mounting hub of the second member.

20. The rotational control apparatus according to claim 19 further comprising, in combination: a journal having a shaft portion; and a second bearing unit, with the second bearing unit being interposed between the shaft portion and the first member for rotatably supporting the first member on the journal.

21. The rotational control apparatus according to claim 17 further comprising, in combination: a jack bolt extending through the first bearing unit, with the mounting hub including a central threaded opening for threadable receipt of the jack bolt, with the first bearing unit being sandwiched between the jack bolt and the mounting hub.

22. The rotational control apparatus according to claim 17 wherein the spring moves the piston to cause engagement between the first and second engagement surfaces.

23. The rotational control apparatus according to claim 17 wherein the spring moves the piston to cause disengagement of the second engagement surface from the first engagement surface.

* * * * *

UNITED STATES PATENT AND TRADEMARK OFFICE
CERTIFICATE OF CORRECTION

PATENT NO. : 6,092,638
DATED : July 25, 2000
INVENTOR(S) : Rick Vatsaas

Page 1 of 1

It is certified that error appears in the above-identified patent and that said Letters Patent is hereby corrected as shown below:

<u>Title page,</u>
Item [57], ABSTRACT,
Line 16, cancel "(b" and substitute therefor -- ( --.

<u>Column 2,</u>
Line 21, cancel "First" and substitute therefor -- first --.

<u>Column 4,</u>
Line 27, cancel "tile" and substitute therefor -- the --.

<u>Column 6,</u>
Line 25, cancel "L," and substitute therefor -- L --.
Line 44, cancel "is" and substitute therefor -- as --.

Signed and Sealed this

Tenth Day of May, 2005

JON W. DUDAS
*Director of the United States Patent and Trademark Office*